United States Patent

Nagano

[11] Patent Number: 6,014,359
[45] Date of Patent: *Jan. 11, 2000

[54] OPTICAL HEAD WITH A POLARIZING DIFFRACTIVE ELEMENT

[75] Inventor: Tsuyoshi Nagano, Tokyo, Japan

[73] Assignee: NEC Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/878,575

[22] Filed: Jun. 19, 1997

[30] Foreign Application Priority Data

Jun. 20, 1996 [JP] Japan .................................. 8-159293
Aug. 27, 1996 [JP] Japan .................................. 8-225275

[51] Int. Cl.$^7$ .................................................. G11B 7/135
[52] U.S. Cl. .......................... 369/112; 369/109; 369/110; 369/44.12
[58] Field of Search ..................................... 369/116, 110, 369/109, 103, 112, 44.12, 44.23, 44.24

[56] References Cited

U.S. PATENT DOCUMENTS

| | | | |
|---|---|---|---|
| 5,517,480 | 5/1996 | Matsuoka et al. | 369/110 |
| 5,600,614 | 2/1997 | Katayama | 369/112 |
| 5,644,413 | 7/1997 | Komma et al. | 369/44.12 |
| 5,659,533 | 8/1997 | Chen et al. | 369/112 |
| 5,677,902 | 10/1997 | Brazas, Jr. | 369/109 |
| 5,684,780 | 11/1997 | Ando | 369/110 |
| 5,696,750 | 12/1997 | Katayama | 369/112 |
| 5,748,574 | 5/1998 | Chao | 369/112 |

FOREIGN PATENT DOCUMENTS

| | | |
|---|---|---|
| 0 612 068 | 8/1994 | European Pat. Off. . |
| 0 683 484 | 11/1995 | European Pat. Off. . |
| 0 692 785 | 1/1996 | European Pat. Off. . |
| 3-29129 | 2/1991 | Japan . |

*Primary Examiner*—Muhammad Edun
*Attorney, Agent, or Firm*—Sughrue, Mion, Zinn, Macpeak & Seas, PLLC

[57] ABSTRACT

Disclosed is an optical head, which has: a light generator which emits linearly polarized light; a lens which converges the light emitted from the light generator on a medium; a light detector which receives the light reflected on the medium; a quarter-wave plate which is disposed between the light generator and the lens and rotates by $\pi/2$ radian a polarization direction of the linearly polarized light when going and returning through the quarter-wave plate; a polarizing diffractive element which is disposed between the light generator and the quarter-wave plate, the polarizing diffractive element transmitting the light travelling from the light generator to the quarter-wave plate and diffracting the light travelling from the quarter-wave plate to the light generator by using a difference in polarization direction; and a polarizing beam splitter which is disposed among the light generator, the light detector and the polarizing diffractive element, the polarizing beam splitter directing the light from the light generator to the polarizing diffractive element and directing the light from the polarizing diffractive element to the light detector by using a difference in polarization direction; wherein the light detector receives the light diffracted by the polarizing diffractive element and the light transmitted through the polarizing diffractive element.

16 Claims, 10 Drawing Sheets

7 : LIGHT-DETECTING MEANS
7a~7n : LIGHT-RECEIVING SECTION
8a~8j : BEAM SPOT

7a~7n : LIGHT-RECEIVING SECTION
8a~8j : BEAM SPOT

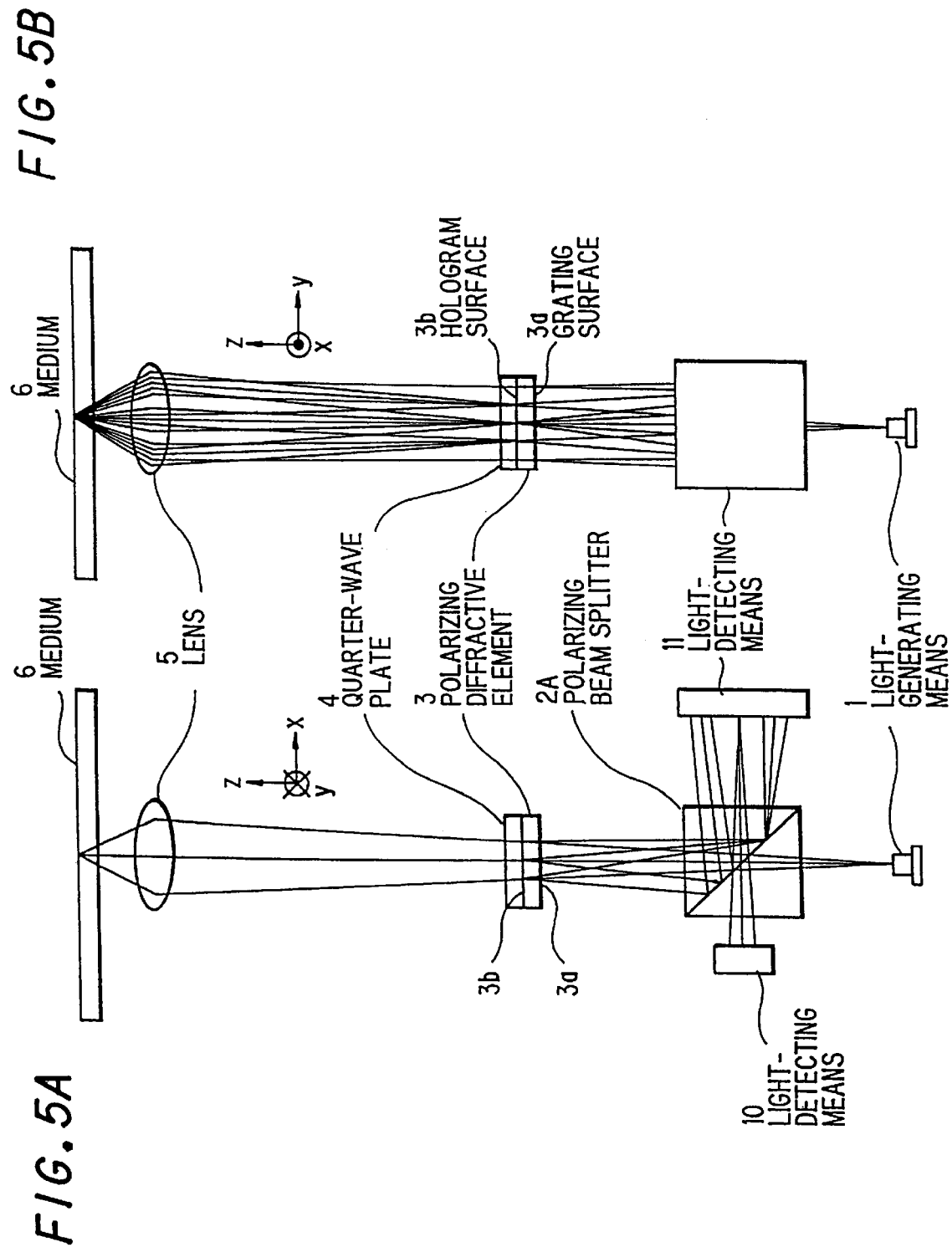

11 : LIGHT-DETECTING MEANS
11a~11m : LIGHT-RECEIVING SECTION
12a~12i : BEAM SPOT

FIG. 7A
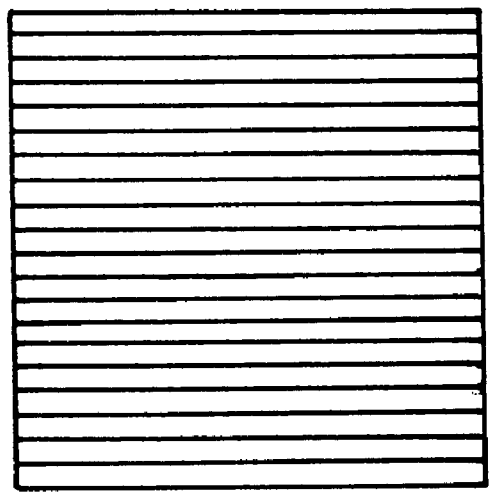 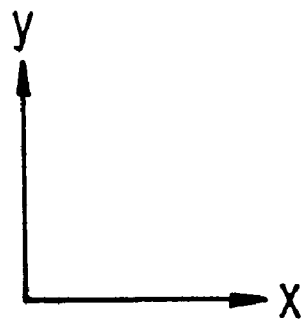
FIG. 7B
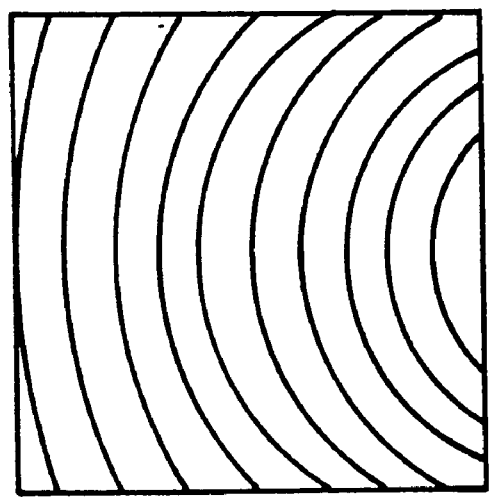 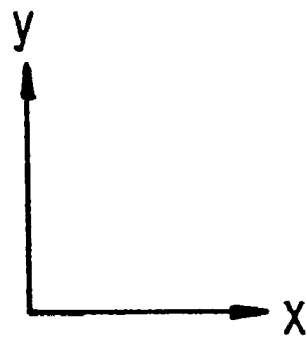

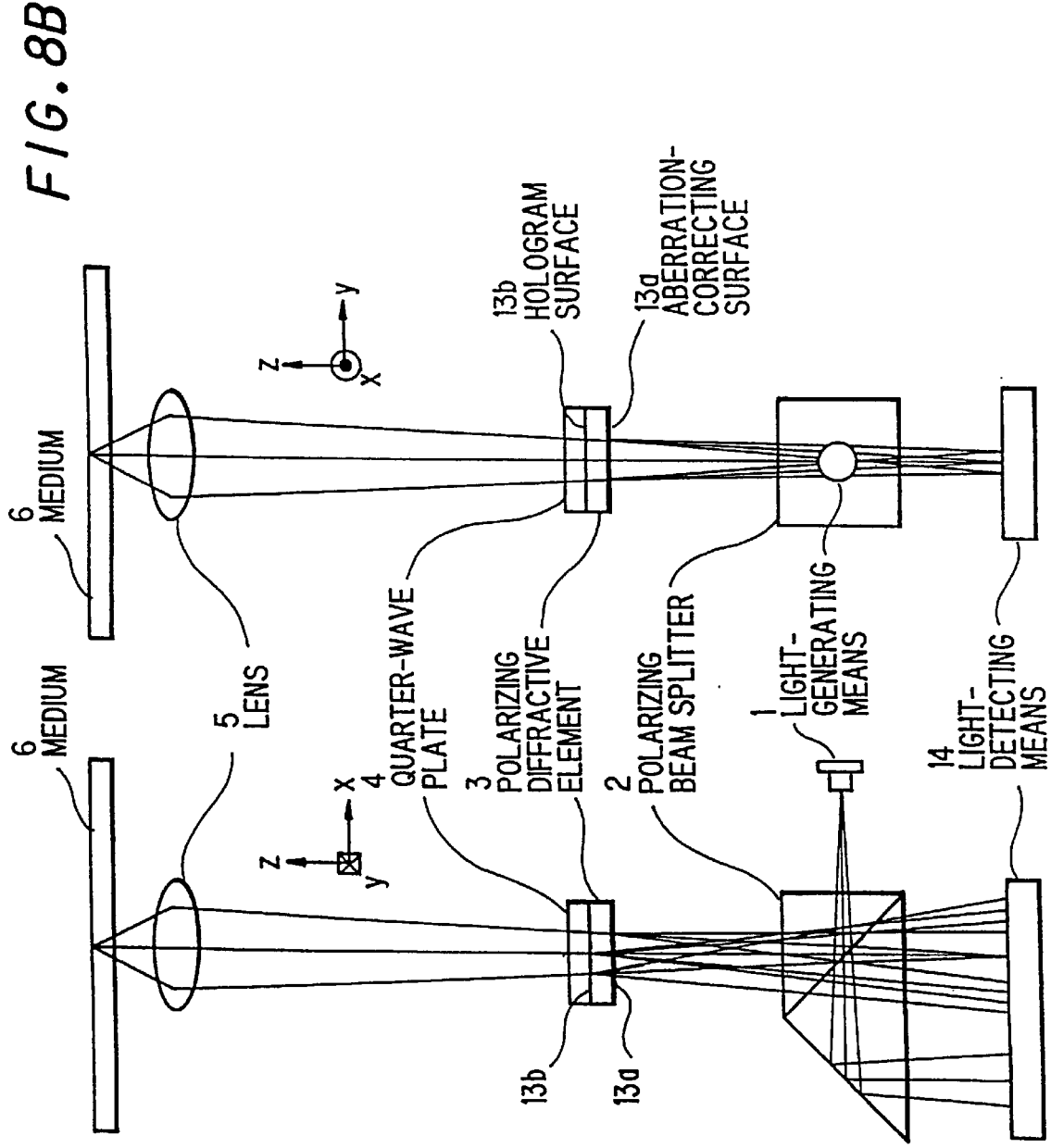

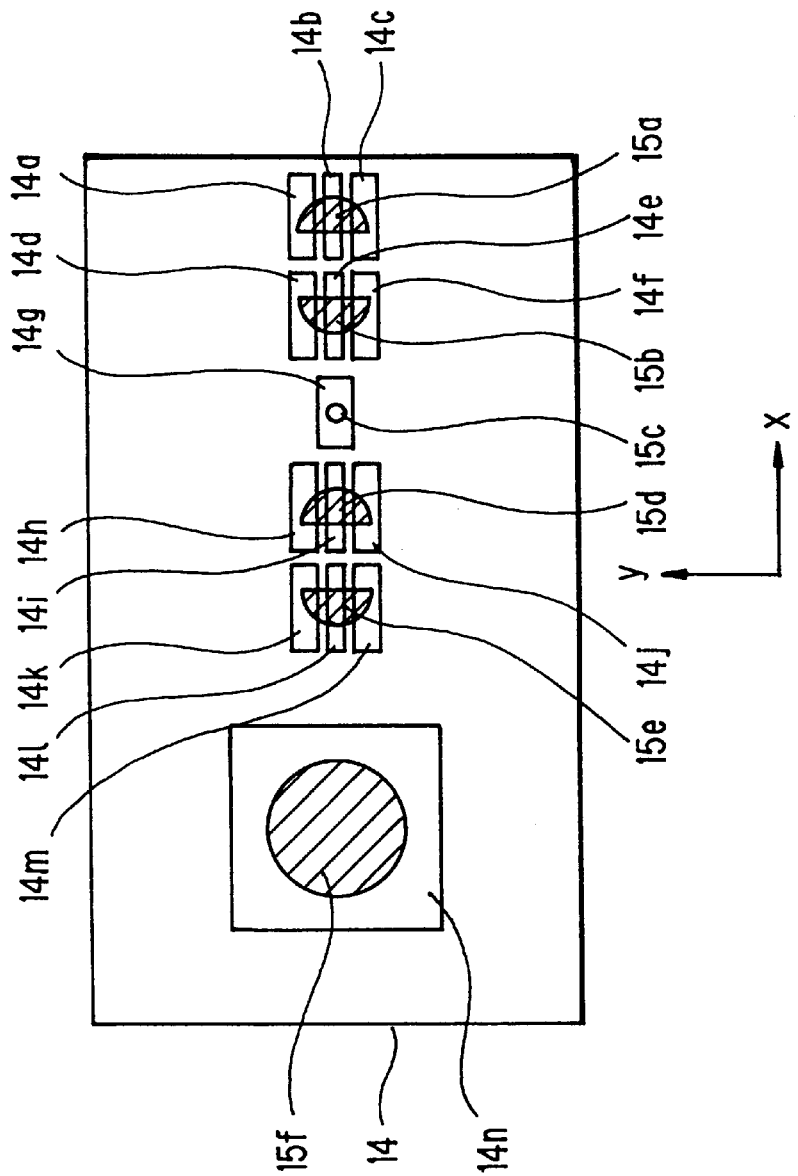

FIG. 10A
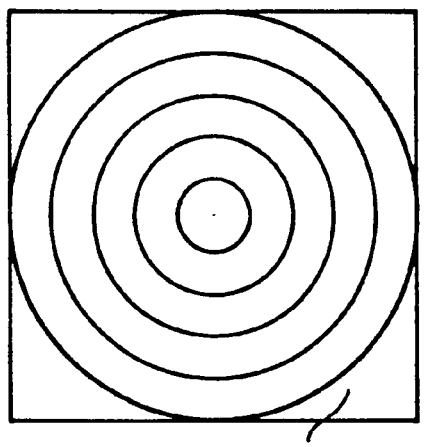
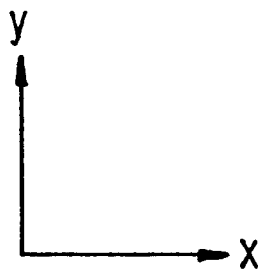
13a ABERRATION-CORRECTING SURFACE
FIG. 10B
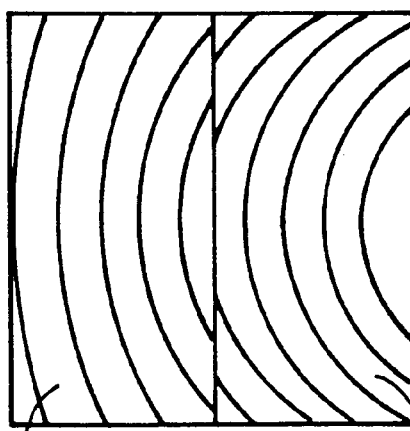
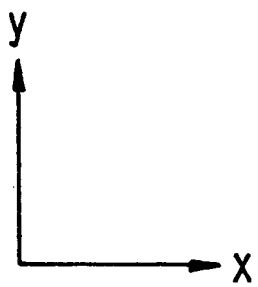
13bb REGION  13ba REGION
13b HOLOGRAM SURFACE

OPTICAL HEAD WITH A POLARIZING DIFFRACTIVE ELEMENT

FIELD OF THE INVENTION

This invention relates to an optical head, and more particularly to, an optical head which is provided with a polarizing diffractive element for separating an optical path to project light from a light source to an optical medium and an optical path to receive reflected light from the optical medium.

BACKGROUND OF THE INVENTION

Optical heads are used to project light onto an optical medium to record information or to receive reflected light from the optical medium to reproduce information Therefore, the optical heads are provided with an optical path to project light from a light source to the optical medium and an optical path to receive reflected light from the optical medium. In some cases, these optical paths may be separated by using a polarizing diffractive element.

Japanese patent application laid-open No.3-29129(1991) discloses an optical head, as shown in FIG. 1, which is provided with a polarizing diffractive element.

In this optical head, a laser diode 101 as a light source emits light polarized in the direction perpendicular to the surface of this sheet. A polarizing diffractive element 102 transmits more than 20 dB of the polarized light in the direction perpendicular to the surface of the sheet and diffracts more than 20 dB of the polarized light in the direction parallel to the surface of the sheet. The light emitted from the laser diode 101 and then transmitted through the polarizing diffractive element 102 is converted into circular polarization light by a quarter-wave plate 103, converged upon an optical disk 105 by a lens 104. Thereby, the recording of information is conducted. On the other hand, light reflected on the optical disk 105 is reversely passed through the same optical path, converted into light polarized in the direction parallel to the surface of the sheet by the quarter-wave plate 103. The polarized light is diffracted by the polarizing diffractive element 102 into +1st-order diffraction light and −1st-order diffraction light, where the +1st-order diffraction light is received by a photodiode 106 and the −1st-order diffraction light is received by a photodiode 107. Thus, based on the lights received by the photodiodes 106, 107, the convergence position on the optical disk 105 can be detected and controlled and the information recorded on the optical disk 105 can be reproduced.

Meanwhile, the polarizing diffractive element 102, as described in the above application, is an element in which an interference fringe is formed according to the existence of proton-exchanging in a lithium niobate crystal by utilizing the fact that an index ellipsoid is varied by proton-exchanging in the lithium niobate crystal. In the polarizing diffractive element 102, a dielectric film formed on a proton-exchanged region controls a phase difference to a non-proton-exchanged region to be even-numbered times a π radian to the light polarized in the direction perpendicular to the surface of the sheet and to be odd-numbered times a π radian to the light polarized in the direction parallel to the surface of the sheet. Thereby, the light polarized in the direction perpendicular to the surface of the sheet is transmitted and the light polarized in the direction parallel to the surface of the sheet is diffracted.

However, in the conventional optical head, there are some problems caused by the fact that the polarizing diffractive element 102 has to be disposed close to the lens 104. The first and second problems are that the environment resistance is deteriorated and that the manufacturing cost of the polarizing diffractive element is increased. In the composition of the conventional optical head, the photodiodes 106, 107 have to be disposed apart from the laser diode 101 to separate the diffraction light from the light projected from the laser diode 101. Therefore, the diffraction angle of reflected light at the polarizing diffractive element 102 needs to be increased. Also, to obtain a high optical power efficiency, it is required that the polarizing diffractive element 102 transmits the light emitted from the laser diode 101 to the quarter-wave plate 103 at a high efficiency and diffracts the light supplied through the quarter-wave plate 103 to the photodiodes 106, 107 at a high efficiency.

Meanwhile, in the fabrication process of the polarizing diffractive element, which is, as described above, composed of the interference fringe formed by proton exchanging and the dielectric film formed on the proton-exchanged region, the proton-exchanged region and the dielectric film have to be formed by a mask commonly used due to a limitation on alignment accuracy of an aligner. However, since the proton exchanging progresses not only in the direction of thickness but also in the in-plane direction, the width of the proton-exchanged region does not agree with that of the dielectric film. When the fringe pitch is decreased to increase the diffraction angle, the influence by the disagreement in width becomes more serious. As a result, the optical power efficiency will be reduced. Thus, it is impossible to have both a big diffraction angle and a high optical power efficiency. In this case, if the optical power efficiency is sacrificed, the reception of light cannot be properly conducted and reliability in the reproduction of information may be reduced. It may therefore cause a functional failure in the optical head.

Therefore, in the conventional optical heads, the diffraction angle has to be sacrificed. To obtain a predetermined distance between the photodiodes 106 and 107, the distance between the polarizing diffractive element 102 and the photodiodes 106, 107 needs to be increased. Therefore, the polarizing diffractive element 102 needs to be disposed close to the lens 104 since the distance between the lens 104 and the laser diode 101 is previously determined. When the polarizing diffractive element 102 is disposed close to the lens 104, an effective area in the polarizing diffractive element 102 where light is projected needs to be increased. Therefore, the polarizing diffractive element 102 needs to be enlarged since the interference fringe has to be formed on the increased effective area. This causes an increase in the manufacturing cost of the polarizing diffractive element. Also, the environment resistance will be deteriorated since the optical path between the polarizing diffractive element 102 and the laser diode 101 and the optical path between the polarizing diffractive element 102 and the photodiodes 106, 107 are lengthened.

The third problem is that an optical module 108, which is composed of the laser diode 101, photodiodes 106, 107, polarizing diffractive element 102 and quarter-wave plate 103 other than the lens 104, cannot be miniaturized. Namely, when the polarizing diffractive element 102 is disposed close to the lens 104, the distance between the polarizing diffractive element 102 and the photodiodes 106, 107 is increased. Therefore, the optical module 108 must be lengthened in the direction of the optical axis. On the other hand, when the photodiodes 106, 107 are disposed apart from the laser diode 101, the distance between the photodiodes 106 and 107 is increased. Therefore, the optical module 108 must be lengthened also in the direction perpendicular to the optical axis.

SUMMARY OF THE INVENTION

Accordingly, it is an object of the invention to provide an optical head with a reduced manufacturing cost and an improved environment resistance.

It is a further object of the invention to provide an optical head which can be miniaturized.

According to the invention, an optical head, comprises:

a light-generating means which emits linearly polarized light;

a lens which converges the light emitted from the light-generating means on a medium;

a light-detecting means which receives the light reflected on the medium;

a quarter-wave plate which is disposed between the light-generating means and the lens and rotates by $\pi/2$ radian a polarization direction of the linearly polarized light when going and returning through the quarter-wave plate;

a polarizing diffractive element which is disposed between the light-generating means and the quarter-wave plate, the polarizing diffractive element transmitting the light travelling from the light-generating means to the quarter-wave plate and diffracting the light travelling from the quarter-wave plate to the light-generating means by using a difference in polarization direction; and a polarizing beam splitter which is disposed among the light-generating means, the light-detecting means and the polarizing diffractive element, the polarizing beam splitter directing the light from the light-generating means to the polarizing diffractive element and directing the light from the polarizing diffractive element to the light-detecting means by using a difference in polarization direction;

wherein the light-detecting means receives the light diffracted by the polarizing diffractive element and the light transmitted through the polarizing diffractive element.

BRIEF DESCRIPTION OF THE DRAWINGS

The invention will be explained in more detail in conjunction with the appended drawings, wherein:

FIGS. 8A and 8B are a front view and a right side view showing an optical head in a third preferred embodiment according to the invention, FIG. 9 is a plan view showing a light-detecting means in FIGS. 8A and 8B, and FIGS. 10A and 10B are plan views showing an aberration-correcting surface and a hologram surface, respectively, of a polarizing diffractive element of the optical head in the third embodiment.

DESCRIPTION OF THE PREFERRED EMBODIMENTS

Figure 1:
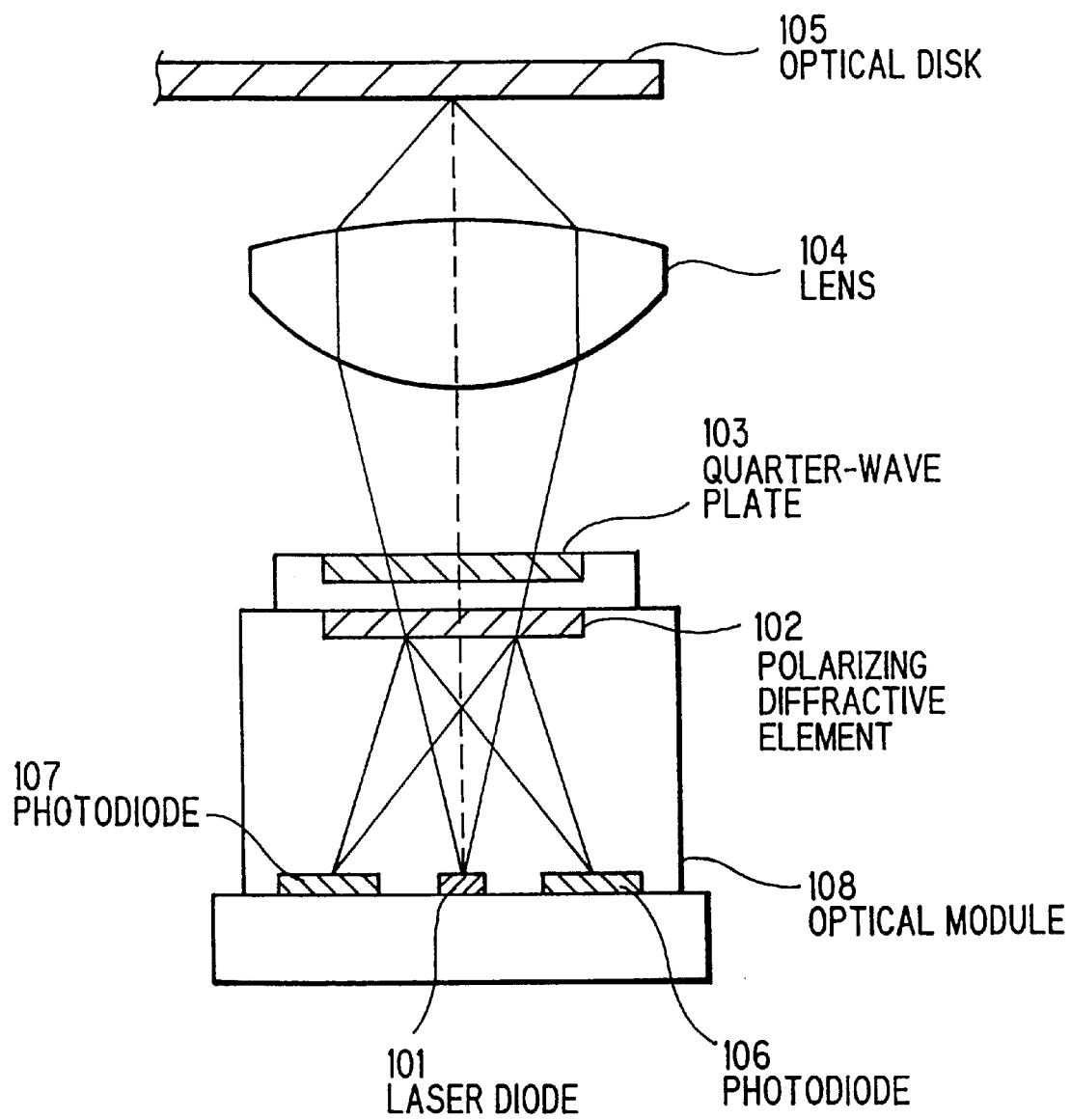
FIG. 1 is a schematic illustration showing the conventional optical head disclosed in Japanese patent application laid-open No.3-29129(1991)
Figure 2:
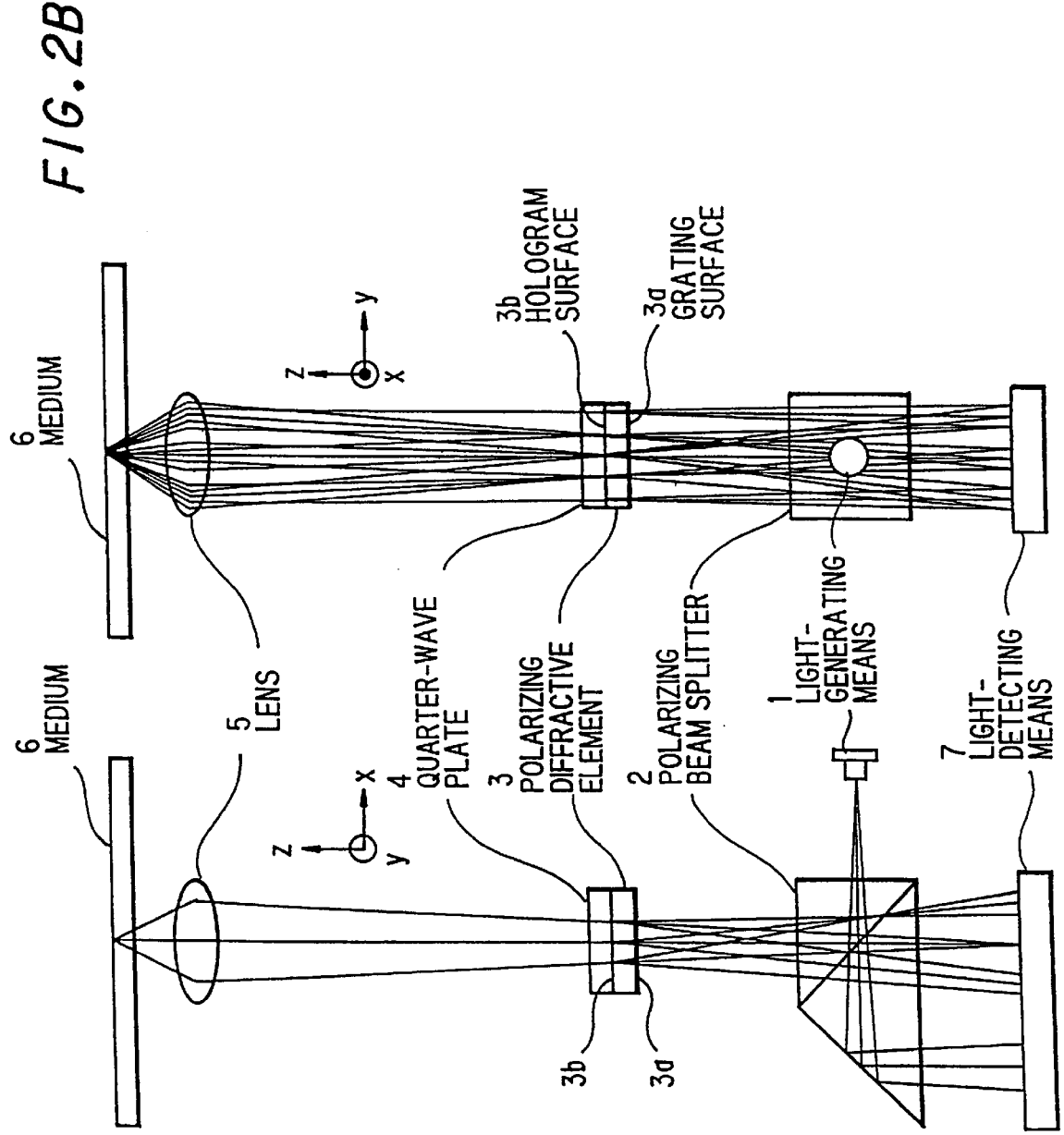
FIGS. 2A and 2B are a front view and a right side view showing an optical head in a first preferred embodiment according to the invention.
Figure 3:
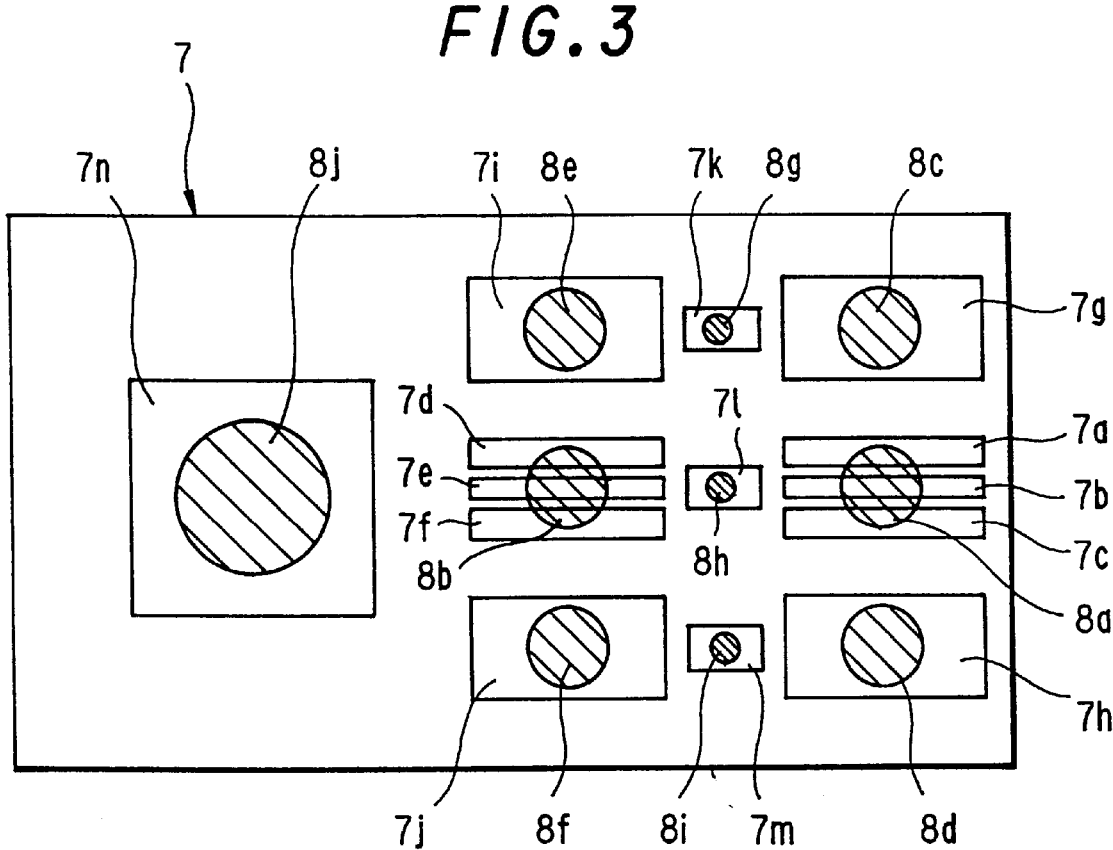
FIG. 3 is a plan view showing a light-detecting means in FIGS. 2A and 2B, FIGS. 4A to 4C are illustrations showing the varying states of beam spots formed on the light-detecting means in FIG.3, FIGS. 5A and 5B are a front view and a right side view showing an optical head in a second preferred embodiment according to the invention.

An optical head in the first preferred embodiment will be explained in FIGS. 2A to 4C. FIGS. 2A and 2B are a front view and a right side view showing the optical head in the first embodiment. FIG. 3 is a plan view showing bean spots formed on a light-detecting means 7. In the first embodiment, as described later, a tracking error signal for controlling a convergence position onto a medium is detected by three-beam method.

Light emitted from a light-generating means 1 and polarized in a y direction is supplied into a polarizing beam splitter 2. The polarizing beam splitter 2 reflects 96% of S-polarized light and transmits 100% of P-polarized light. The light transmitted through the polarizing beam splitter 2 is reflected on its end surface, forming a beam spot $8j$ on the light-detecting means 7, detected at a light-receiving section $7n$, used to measure a quantity of light emitted from the light-generating means 1.

On the other hand, the light reflected by the polarizing beam splitter 2 is supplied to a polarizing diffractive element 3. The polarizing diffractive element 3, where a grating surface $3a$ is formed on the lower surface and a hologram surface $3b$ is formed on the upper surface, diffracts the light in directions orthogonal to each other. FIGS. 7A and 7B are plan views showing the grating surface $3a$ and the hologram surface $3b$, respectively. The grating surface $3a$ has a straight-line fringe parallel to an x axis. The hologram surface $3b$ has an interference fringe which is formed on the hologram surface $3b$ when point light sources are placed at a point between the polarizing diffractive element 3 and the light-detecting means 7 where +1st-order diffraction light is desired to converge and at a light-emitting point of the light-generating means 1. The grating surface $3a$ transmits 95% of the light polarized in the y direction and diffracts 5% thereof, and it transmits 20 dB or more of the light polarized in the x direction. The hologram surface $3b$ transmits 20 dB or more of the light polarized in the y direction, and it transmits 95% of the light polarized in the x direction and diffracts 5% thereof.

Meanwhile, the grating surface $3a$ and the hologram surface $3b$ of the polarizing diffractive element 3 is provided with the interference fringe formed according to the existence of proton-exchanging in, for example, a lithium niobate crystal by utilizing that an index ellipsoid is varied by proton-exchanging the lithium niobate crystal. In case of the grating surface $3a$, a dielectric film formed on a proton-exchanged region controls a phase difference to a non-proton-exchanged region to be even-numbered times a $\pi$ radian to the light polarized in the x direction and to be a proper value to the light polarized in the y direction. Thereby, the light polarized in the x direction is transmitted and the light polarized in the y direction is diffracted and transmitted.

In case of the hologram surface $3b$, a dielectric film formed on a proton-exchanged region controls a phase difference to a non-proton-exchanged region to be even-numbered times a $\pi$ radian to the light polarized in the y direction and to be a proper value to the light polarized in the x direction. Thereby, the light polarized in the y direction is transmitted and the light polarized in the x direction is diffracted and transmitted.

The light transmitted through the grating surface 3a of the polarizing diffractive element 3 and the light diffracted by the grating surface 3a of the polarizing diffractive element 3 are transmitted through the hologram surface 3b of the polarizing diffractive element 3, converted into circular polarization light by a quarter-wave plate 4, converged on a medium 6 such as an optical disk by a lens 5. By this convergence, information is recorded on the medium 6 or light with a reflectivity according to information already recorded is reflected. The light reflected on the medium 6 reversely passes through the same optical path, converted into light polarized in the x direction by the quarter-wave plate 4. Then, the light transmitted through the hologram surface 3b of the polarizing diffractive element 3 and the light diffracted by the hologram surface 3b of the polarizing diffractive element 3 are transmitted through the grating surface 3a of the polarizing diffractive element 3, transmitted through the polarizing beam splitter 2, received by the light-detecting means 7.

The grating surface 3a of the polarizing diffractive element 3 is so adjusted that +1st-order diffraction light, transmitted light and −1st-order diffraction light are on the left edge, center and right edge, respectively, of a track of the medium 6. Also, the hologram surface 3b of the polarizing diffractive element 3 is so formed that +1st-order diffraction light, transmitted light and −1st-order diffraction light have convergence points before, on the surface of and behind, respectively, the light-detecting means 7 when the medium 6 lies at the convergence point of the lens 5. As a result, as shown in FIG. 3, nine beam spots in total are formed on the light-detecting means 7 by the diffraction and transmission of the grating surface 3a and the hologram surface 3b. Besides, the beam spot 8j is, as described earlier, formed by the light-generating means 1.

Beam spots 8a, 8h and 8b formed on the light-detecting means 7 are formed by the transmitted light through the grating surface 3a of the polarizing diffractive element 3, bean spots 8c, 8g and 8e are formed by the +1st-order diffraction light of the grating surface 3a and beam spots 8d, 8i and 8f are formed by the −1st-order diffraction light of the grating surface 3a. In other words, the beam spots 8g, 8h and 8i are formed by the transmitted light through the hologram surface 3b of the polarizing diffractive element 3, the beam spots 8c, 8a and 8d are formed by the +1st-order diffraction light of the hologram surface 3b and the beam spots 8e, 8b and 8f are formed by the −1st-order diffraction light of the hologram surface 3b.

The combination of light-receiving sections 7a, 7b and 7c provided on the light-detecting means 7 is used to detect the beam spot 8a, and the combination of light-receiving sections 7d, 7e and 7f is used to detect the beam spot 83b. Also, light-receiving sections 7g, 7h, 7i, 7j, 7k, 7l and 7m are used to detect the beam spots 8c, 8d, 8e, 8f, 8g, 8h and 8i, respectively.

Figure 4A:
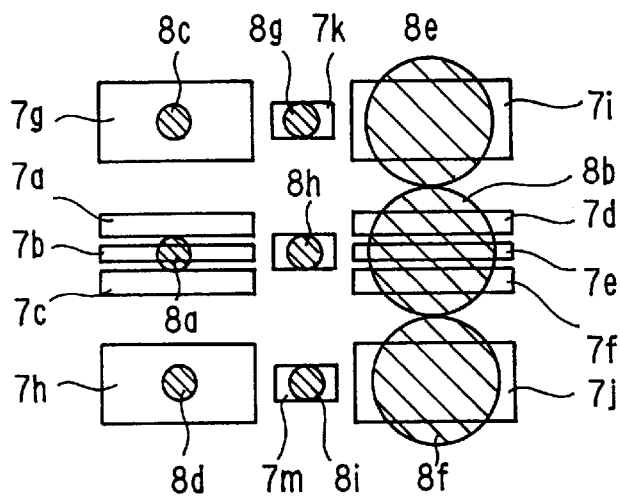
Figure 4B:
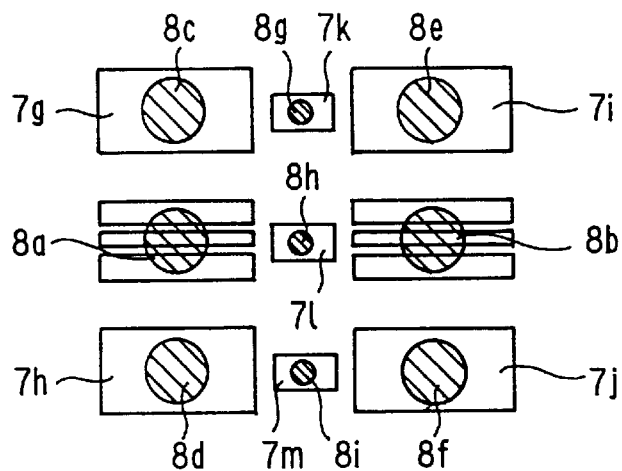
Figure 4C:
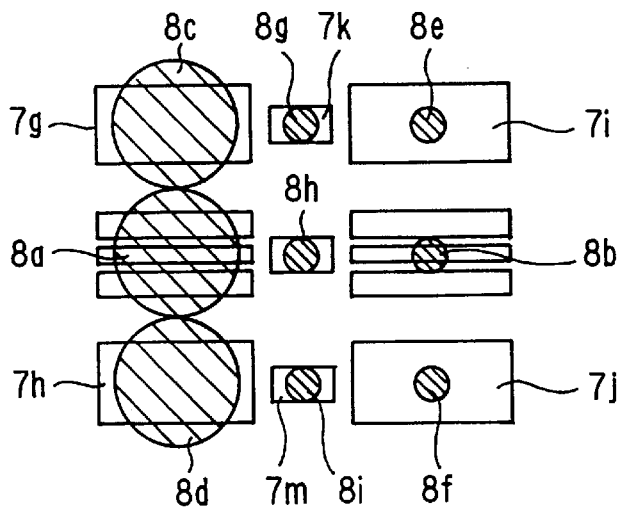

Therefore, by detecting the beam spots at the respective light-receiving sections of the light-detecting means 7, a focusing error signal and a tracking error signal for controlling the convergence state onto the medium 6 can be obtained and an information-reproducing signal can be obtained. For example, as shown in FIGS. 4A to 4C, where various states of the beam spots on the light-detecting means 7 varied according to the position change onto the medium 6 against the convergence point of the lens 5 are shown, it is proved that the respective beam spots are varied according to the position change of the medium 6. If signals detected by the light-receiving sections 7a to 7m of the light-detecting means 7 are defined as S7a to S7m, respectively, the focusing error signal is obtained from (S7a−S7b+S7c−S7d+S7e−S7f), the tracking error signal is obtained from (S7g−S7h+S7i−S7j+S7k−S7m), and the information-reproducing signal is obtained from the signal S7l.

In the first embodiment, by inserting the polarizing beam splitter 2 between the light-generating means 1 and the light-detecting means 7, the light-generating means 1 and the light-detecting means 7 can be disposed physically apart from each other. Therefore, the intervals between the light-receiving sections of the light-detecting means 7 can be narrowed and the diffraction angle of the polarizing diffractive element 3 can be decreased. As a result, the polarizing diffractive element 3 can be disposed apart from the lens 5 and close to the light-detecting means 7. Therefore, for example, when the polarizing diffractive element 3, quarter-wave plate 4, light-generating means 1, light-detecting means 7 and polarizing beam splitter 2 are integrated into a module, the module can be miniaturized and the entire optical head can be thereby miniaturized. Furthermore, by separating the polarizing diffractive element 3 from the lens 5, the effective area required in the polarizing diffractive element 3 can be decreased and the manufacturing cost can be thereby reduced.

In the first embodiment, a good information-reproducing signal can be obtained by diffracting a minimum quantity of light to detect the focusing error signal and the tracking error signal by the polarizing diffractive element and by transmitting the remainder of the light therethrough. Namely, the depth of proton-exchanging region required to fabricate the polarizing diffractive element is very shallow, thereby the problem that the proton exchanging is progressed in the in-plane direction becomes so unimportant as to be worth little consideration. Therefore, the polarizing diffractive element with a narrow fringe pitch and a large diffraction angle which is required for the optical head in the first embodiment, where part of light polarized in a specific direction is diffracted and the remainder is transmitted and light polarized in a direction orthogonal thereto is completely transmitted, can be obtained.

An optical head in the second preferred embodiment will be explained in FIGS. 5A to 6. FIGS. 5A and 5B are a front view and a right side view showing the optical head in the first embodiment, wherein like parts are indicated by like reference numerals as used in FIGS. 2A and 2B.

Light emitted from a light-generating means 1 and polarized in a x direction is supplied into a polarizing beam splitter 2A, where 96% of the light is transmitted. The light reflected by the polarizing beam splitter 2A is received by a light-detecting means 10, used to measure a quantity of light emitted from the light-generating means 1. A grating surface 3a formed on the lower surface of a polarizing diffractive element 3 transmits 95% of the light polarized in the x direction and diffracts 5% thereof, and it transmits 20 dB or more of the light polarized in the y direction. A hologram surface 3b formed on the upper surface of the polarizing diffractive element 3 transmits 20 dB or more of the light polarized in the x direction, and it transmits 95% of the light polarized in the y direction and diffracts 5% thereof. The light transmitted through the grating surface 3a of the polarizing diffractive element 3 and the light diffracted by the grating surface 3a of the polarizing diffractive element 3 are transmitted through the hologram surface 3b of the polarizing diffractive element 3, converted into circular polarization light by a quarter-wave plate 4, converged on a medium 6 such as an optical disk by a lens 5.

The light reflected on the medium 6 reversely passes through the same optical path, converted into light polarized in the y direction by the quarter-wave plate 4. Then, the light transmitted through the hologram surface 3b of the polarizing diffractive element 3 and the light diffracted by the hologram surface 3b of the polarizing diffractive element 3 are transmitted through the grating surface 3a of the polarizing diffractive element 3, reflected by the polarizing beam splitter 2A, received by a light-detecting means 11. Meanwhile, the grating surface 3a of the polarizing diffractive element 3 is so adjusted that +1st-order diffraction light, transmitted light and −1st-order diffraction light are the left edge, center and right edge, respectively, of a track of the medium 6. Also, the hologram surface 3b of the polarizing diffractive element 3 is so formed that +1st-order diffraction light, transmitted light and −1st-order diffraction light have convergence points before, on the surface of and behind, respectively, the light-detecting means 11 when the medium 6 lies at the convergence point of the lens 5.

Figure 6:
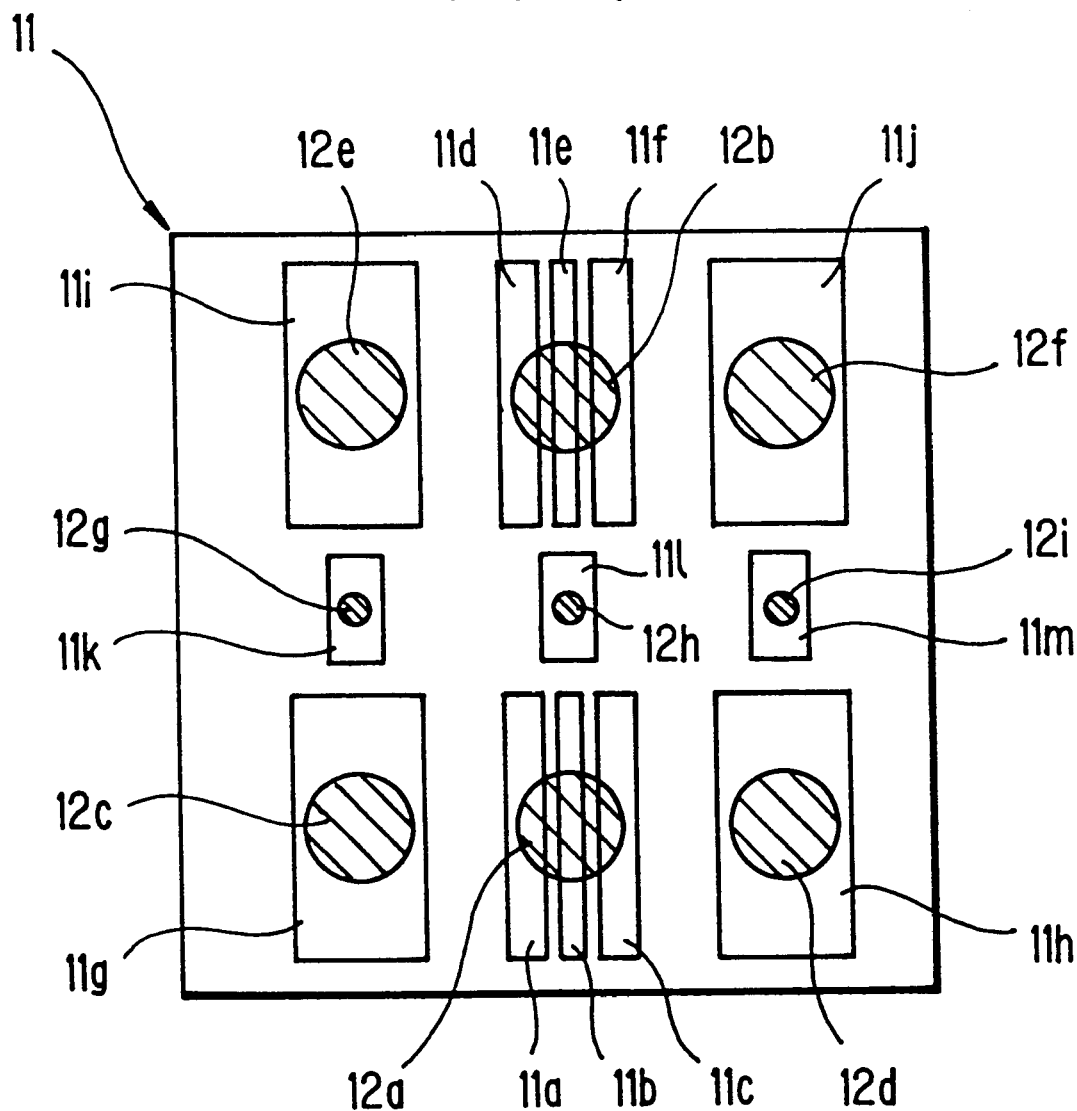
FIG. 6 is a plan view showing a light-detecting means in FIGS. 5A and 5B, FIGS. 7A and 7B are plan views showing a grating surface and a hologram surface, respectively, of a polarizing diffractive element of the optical head in the first embodiment.

FIG. 6 is a plan view showing the relationship between beam spots formed on the light-detecting means 11 and light-receiving sections. Beam spots 12a, 12h and 12b are formed by the transmitted light through the grating surface 3a of the polarizing diffractive element 3, beam spots 12c, 12g and 12e are formed by the +1st-order diffraction light of the grating surface 3a and beam spots 12d, 12i and 12f are formed by the −1st-order diffraction light of the grating surface 3a. In other words, the beam spots 12g, 12h and 12i are formed by the transmitted light through the hologram surface 3b of the polarizing diffractive element 3, the beam spots 12c, 12a and 12d are formed by the +1st-order diffraction light of the hologram surface 3b and the beam spots 12e, 12b and 12f are formed by the −1st-order diffraction light of the hologram surface 3b.

The combination of light-receiving sections 11a, 11b and 11c provided on the light-detecting means 11 is used to detect the beam spot 12a, and the combination of light-receiving sections 11d, 11e and 11f is used to detect the beam spot 12b. Also, light-receiving sections 11g, 11h, 11i, 11j, 11k, 11l and 11m are used to detect the beam spots 12c, 12d, 12e, 12f, 12g, 12h and 12i, respectively.

If signals detected by the light-receiving sections 11a to 11m of the light-detecting means 11 are defined as S11a to S11m, respectively, a focusing error signal is obtained from (S11a−S11b+S11c−S11d+S11e−S11f), a tracking error signal is obtained from (S11g−S11h+S11i−S11j+S11k−S11m), and an information-reproducing signal is obtained from the signal S11l.

In the second embodiment, by inserting the polarizing beam splitter 2A between the light-generating means 1 and the light-detecting means 11, the light-generating means 1 and the light-detecting means 11 can be disposed physically apart from each other. Therefore, the intervals between the light-receiving sections of the light-detecting means 11 can be narrowed and the diffraction angle of the polarizing diffractive element 3 can be decreased. As a result, the polarizing diffractive element 3 can be disposed apart from the lens 5 and close to the light-detecting means 11. Therefore, for example, when the polarizing diffractive element 3, quarter-wave plate 4, light-generating means 1, light-detecting means 11 and polarizing beam splitter 2A are integrated into a module, the module can be miniaturized and the entire optical head can be thereby miniaturized. Furthermore, by separating the polarizing diffractive element 3 from the lens 5, the effective area required in the polarizing diffractive element 3 can be decreased and the manufacturing cost can be thereby reduced.

In the second embodiment, a good information-reproducing signal can be obtained by diffracting a minimum quantity of light to detect the focusing error signal and the tracking error signal by the polarizing diffractive element and by transmitting the remainder of the light therethrough. Namely, the depth of proton-exchanging region required to fabricate the polarizing diffractive element is very shallow, thereby the problem that the proton exchanging is progressed in the in-plane direction becomes so unimportant as to be worth little consideration. Therefore, the polarizing diffractive element with a narrow fringe pitch and a large diffraction angle which is required for the optical head in the second embodiment, where part of light polarized in a specific direction is diffracted and the remainder is transmitted and light polarized in a direction orthogonal thereto is completely transmitted, can be obtained.

An optical head in the third preferred embodiment will be explained in FIGS. 8A to 9. FIGS. 8A and 8B are a front view and a right side view showing the optical head in the third embodiment, wherein like parts are indicated by like reference numerals as used in FIGS. 2A and 2B.

Light emitted from a light-generating means 1 and polarized in a y direction is supplied into a polarizing beam splitter 2, where 96% of the light is reflected, then supplied into polarizing diffractive element 13. The polarizing diffractive element 13 has an aberration-correcting surface 13a formed on the lower surface and a hologram surface 13b formed on the upper surface. On the aberration-correcting surface 13a, formed is an interference fringe for correcting an aberration, e.g., spherical aberration, which occurs when divergent light is transmitted through the polarizing beam splitter 2. On the hologram surface 13b, formed is an interference fringe which is formed on the hologram surface 13b when point light source, are placed at a point between the polarizing diffractive element 13 and the light-detecting means 14 where +1st-order diffraction light is desired to converge and at a light-emitting point of the light-generating means 1. The aberration-correcting surface 13a diffracts 20 dB or more of the light polarized in the y direction and transmits 20 dB or more of the light polarized in the x direction. The hologram surface 13b transmits 20 dB or more of the light polarized in the y direction, and it transmits 90% of the light polarized in the x direction ant diffracts 10% thereof.

Meanwhile, the aberration-correcting surface 13a and the hologram surface 13b of the polarizing diffractive element 13 is provided with the interference fringe formed according to the existence of proton-exchanging in, for example, a lithium niobate crystal by utilizing that an index ellipsoid is varied by proton-exchanging the lithium niobate crystal. In case of the aberration-correcting surface 13a, a dielectric film formed on a proton-exchanged region controls a phase difference to a non-proton-exchanged region to be odd-numbered times a π radian to the light polarized in the y direction and to be even-numbered times a π radian to the light polarized in the x direction. Thereby, the light polarized in the y direction is almost diffracted and the light polarized in the x direction is almost transmitted. In case of the hologram surface 13b, a dielectric film formed on a proton-exchanged region controls a phase difference to a non-proton-exchanged region to be even-numbered times a π radian to the light polarized in the y direction and to be a proper value to the light polarized in the x direction. Thereby, the light polarized in the y direction is transmitted and the light polarized in the x direction is diffracted and transmitted.

On the aberration-correcting surface 13a of the polarizing diffractive element 13, formed is an interference fringe for correcting an aberration, e.g., spherical aberration, which occurs when divergent light is transmitted through the polarizing beam splitter 2, where the fringe pitch is generally very broad. Therefore, the problem that the proton exchanging is progressed in the in-plane direction becomes so unimportant as to be little worth consideration, whereby the light polarized in the y direction can be almost diffracted and the light polarized in the x direction can be almost transmitted. Though forming the aberration-correcting surface 13a on the polarizing diffractive element 13 contributes to an improvement in the quality of information-reproducing signal, it is not always necessary.

The light diffracted by the aberration-correcting surface 13a of the polarizing diffractive element 13 and restored to spherical wave is transmitted through the hologram surface 13b, converted into circular polarization light by a quarter-wave plate 4, converged on a medium 6 by a lens 5. The light reflected on the medium 6 reversely passes through the same optical path, converted into light polarized in the x direction by the quarter-wave plate 4. Then, the light transmitted through the hologram surface 13b and the light diffracted by the hologram surface 13b are transmitted through the aberration-correcting surface 13a, transmitted through the polarizing beam splitter 2, received by a light-detecting means 14. FIG. 9 is a plan view showing the relationship between beam spots formed on the light-detecting means 14 and light-receiving sections.

FIGS. 10A and 10B are plan views showing the aberration-correcting surface 13a and the hologram surface 13b. The hologram surface 13b is divided into a region 13ba and a region 13bb by a line parallel to a y axis which passes through the optical axis. As shown in FIG. 9, +1st-order diffraction light at the region 13ba forms a beam spot 15b on the light-detecting means 14 and −1st-order diffraction light thereat forms a beam spot 15d on the light-detecting means 14. Also, +1st-order diffraction light at the region 13bb forms a beam spot 15a on the light-detecting means 14 and −1st-order diffraction light thereat forms a beam spot 15e on the light-detecting means 14. The transmitted light through the hologram surface 13b forms a beam spot 15c on the light-detecting means 14. A beam spot 15f is formed by the light emitted from the light-generating means 1 and transmitted through the polarizing beam splitter 2.

The combination of light-receiving sections 14a, 14b and 14c provided on the light-detecting means 14 is used to detect the beam spot 15a, and the combination of light-receiving sections 14d, 14e and 14f is used to detect the beam spct 15b. Also, the combination of light-receiving sections 14h, 14i and 14j is used to detect the beam spot 15d, and the combination of light-receiving sections 14k, 14l and 14m is used to detect the beam spot 15e. Light-receiving sections 14g and 14n are used to detect the beam spots 15c and 15f, respectively.

If signals detected by the light-receiving sections 14a to 14n of the light-detecting means 14 are defined as S14a to S14n, respectively, a focusing error signal is obtained from (S14a−S14b+S14c+S14 d−S14e+S14f−S14h+S14i−S14j−S14k+S14l−S14m), a tracking error signal is obtained from (S14a+S14b+S14c−S14 d−S14e−S14f−S14h−S14i−S14j+S14k+S14l+S14m), and an information-reproducing signal is obtained from the signal S14g. A quantity of light emitted from the light-generating means 1 is measured by the signal S14n.

In the third embodiment, by inserting the polarizing beam splitter 2 between the light-generating means 1 and the light-detecting means 14, the light-generating means 1 and the light-detecting means 14 can be disposed physically apart from each other. Therefore, the intervals between the light-receiving sections of the light-detecting means 14 can be narrowed and the diffraction angle of the polarizing diffractive element 13 can be decreased. As a result, the polarizing diffractive element 13 can be disposed apart from the lens 5 and close to the light-detecting means 14. Therefore, for example, when the polarizing diffractive element 13, quarter-wave plate 4, light-generating means 1, light-detecting means 14 and polarizing beam splitter 2 are integrated into a module, the module can be miniaturized and the entire optical head can be thereby miniaturized. Furthermore, by separating the polarizing diffractive element 13 from the lens 5, the effective area required in the polarizing diffractive element 13 can be decreased and the manufacturing cost can be thereby reduced.

In the third embodiment, a good information-reproducing signal can be obtained by diffracting a minimum quantity of light to detect the focusing error signal and the tracking error signal by the polarizing diffractive element and by transmitting the remainder of the light therethrough. Namely, the depth of proton-exchanging region required to fabricate the polarizing diffractive element is very shallow, thereby the problem that the proton exchanging is progressed in the in-plane direction becomes so unimportant as to be worth little consideration. Therefore, the polarizing diffractive element with a narrow fringe pitch and a large diffraction angle which is required for the optical head in the third embodiment, where part of light polarized in a specific direction is diffracted and the remainder is transmitted and light polarized in a direction orthogonal thereto is completely transmitted, can be obtained.

In the first to third embodiments, the focusing error signal is detected by spot size method and the tracking error signal is detected by three-beam method or push-pull method. However, in the invention, the method for detecting the focusing error signal and the tracking error signal is not limited to these method. For example, the focusing error signal may be detected by knife-edge method and the tracking error signal may be detected by differential phase detection method. These methods can be easily conducted by altering the polarizing diffractive element and the light-detecting means. When the tracking error signal is detected by differential phase detection method other than three-beam method, the fringe pattern may be formed only on one surface of the polarizing diffractive element, not on both the surfaces of the polarizing diffractive element. Thereby, the manufacturing process can be simplified. On the other hand, a laser diode may be used as the light-generating means 1 and photodiodes may be used as the light-detecting means 7, 11 and 14 to facilitate the fabrication of the optical heads in the first to third embodiments.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. An optical head, comprising:

a light-generating means which emits linearly polarized light;

a lens which converges said light emitted from said light-generating means on a medium;

a light-detecting means which receives said light reflected on said medium;

a quarter-wave plate which is disposed between said light-generating means and said lens and rotates by $\pi/2$ radian a polarization direction of said linearly polarized light when going and returning through said quarter-wave plate;

a polarizing diffractive element which is disposed between said light-generating means and said quarter-wave plate, said polarizing diffractive element transmitting said light travelling from said light-generating means to said quarter-wave plate and diffracting said light travelling from said quarter-wave plate to said light-generating means by using a difference in polarization direction; and a polarizing beam splitter which is disposed among said light-generating means, said light-detecting means and said polarizing diffractive element, said polarizing beam splitter directing said light from said light-generating means to said polarizing diffractive element and directing said light from said polarizing diffractive element to said light-detecting means by using a difference in polarization direction;

wherein said light-detecting means receives said light diffracted by said polarizing diffractive element and said light transmitted through said polarizing diffractive element.

2. An optical head, according to claim 1, wherein:

said polarizing beam splitter reflects said light from said light-generating means in the direction of said polarizing diffractive element and transmits said light from said polarizing diffractive element in the direction of said light-detecting means.

3. An optical head, according to claim 2, wherein:

said polarizing diffractive element transmits most of light polarized in a direction and diffracts the remainder at its one surface, and said polarizing diffractive element transmits most of light polarized in the other direction and diffracts the remainder at its other surface.

4. An optical head, according to claim 3, wherein:

said light-detecting means comprises light-receiving sections for receiving said diffracted light and said transmitted light, respectively, at said one surface and light-receiving sections for receiving said diffracted light and said transmitted light, respectively, at said other surface.

5. An optical head, according to claim 2, wherein:

said polarizing beam splitter divides part of said light travelling from said light-generating means to said polarizing diffractive element;

said optical head further comprises a light-receiving means for receiving said divided light;

said light-generating means is controlled to have a light output based on an output of said light-receiving means.

6. An optical head, according to claim 1, wherein:

said polarizing beam splitter transmits said light from said light-generating means in the direction of said polarizing diffractive element and reflects said light from said polarizing diffractive element in the direction of said light-detecting means.

7. An optical head, according to claim 6, wherein:

said polarizing diffractive element transmits most of light polarized in a direction and diffracts the remainder at its one surface, and said polarizing diffractive element transmits most of light polarized in the other direction and diffracts the remainder at its other surface.

8. An optical head, according to claim 7, wherein:

said light-detecting means comprises light-receiving sections for receiving said diffracted light and said transmitted light, respectively, at said one surface and light-receiving sections for receiving said diffracted light and said transmitted light, respectively, at said other surface.

9. An optical head, according to claim 6, wherein:

said polarizing beam splitter divides part of said light travelling from said light-generating means to said polarizing diffractive element;

said optical head further comprises a light-receiving means for receiving said divided light;

said light-generating means is controlled to have a light output based on an output of said light-receiving means.

10. An optical head, according to claim 1, wherein:

said polarizing diffractive element transmits most of light polarized in a direction and diffracts the remainder at its one surface, and said polarizing diffractive element transmits most of light polarized in the other direction and diffracts the remainder at its other surface.

11. An optical head, according to claim 10, wherein:

said light-detecting means comprises light-receiving sections for receiving said diffracted light and said transmitted light, respectively, at said one surface and light-receiving sections for receiving said diffracted light and said transmitted light, respectively, at said other surface.

12. An optical head, according to claim 11, wherein:

a focusing error signal and a tracking error signal of said optical head to said medium and an information-reproducing signal recorded on said medium are obtained based on a quantity of light received by said respective light-receiving sections.

13. An optical head, according to claim 12, wherein:

said polarizing beam splitter divides part of said light travelling from said light-generating means to said polarizing diffractive element;

said optical head further comprises a light-receiving means for receiving said divided light;

said light-generating means is controlled to have a light output based on an output of said light-receiving means.

14. An optical head, according to claim 11, wherein:

said polarizing beam splitter divides part of said light travelling from said light-generating means to said polarizing diffractive element;

said optical head further comprises a light-receiving means for receiving said divided light;

said light-generating means is controlled to have a light output based on an output of said light-receiving means.

15. An optical head, according to claim 10, wherein:

said polarizing beam splitter divides part of said light travelling from said light-generating means to said polarizing diffractive element;

said optical head further comprises a light-receiving means for receiving said divided light;

said light-generating means is controlled to have a light output based on an output of said light-receiving means.

16. An optical head, according to claim 1, wherein:

said polarizing beam splitter divides part of said light travelling from said light-generating means to said polarizing diffractive element;

said optical head further comprises a light-receiving means for receiving said divided light;

said light-generating means is controlled to have a light output based on an output of said light-receiving means.

* * * * *

UNITED STATES PATENT AND TRADEMARK OFFICE
CERTIFICATE OF CORRECTION

PATENT NO. : 6,014,359  
DATED : January 11, 2000  
INVENTOR(S) : Tsuyoshi Nagano Page 1 of 1

It is certified that error appears in the above-identified patent and that said Letters Patent is hereby corrected as shown below:

Column 5,
Line 55, delete "83b" and insert therefor --8b--.

Column 11,
Line 27, delete "Claim 2" and insert therefor --Claim 1--.

Signed and Sealed this

Nineteenth Day of June, 2001

Attest:

NICHOLAS P. GODICI
Attesting Officer     Acting Director of the United States Patent and Trademark Office